United States Patent
Wiik et al.

(10) Patent No.: US 9,592,788 B2
(45) Date of Patent: Mar. 14, 2017

(54) FRONT CENTER AIRBAG LOWER CHAMBER AND PANEL

(71) Applicants: GM Global Technology Operations LLC, Detroit, MI (US); TK Holdings Inc., Auburn Hills, MI (US)

(72) Inventors: Richard Wiik, Fort Gratiot, MI (US); Scott D. Thomas, Novi, MI (US)

(73) Assignees: GM Global Technology Operations LLC, Detroit, MI (US); TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/596,743

(22) Filed: Jan. 14, 2015

(65) Prior Publication Data
US 2016/0200278 A1    Jul. 14, 2016

(51) Int. Cl.
| | |
|---|---|
| B60R 21/16 | (2006.01) |
| B60R 21/233 | (2006.01) |
| B60R 21/231 | (2011.01) |
| B60R 21/2338 | (2011.01) |
| B60R 21/2342 | (2011.01) |

(52) U.S. Cl.
CPC ........ B60R 21/233 (2013.01); B60R 21/2338 (2013.01); B60R 21/2342 (2013.01); B60R 21/23138 (2013.01); B60R 2021/23107 (2013.01); B60R 2021/23316 (2013.01)

(58) Field of Classification Search
USPC ........................ 280/730.2, 743.1, 743.2, 729
See application file for complete search history.

(56) References Cited

U.S. PATENT DOCUMENTS

| | | | | |
|---|---|---|---|---|
| 5,730,464 | A * | 3/1998 | Hill | B60R 21/23138 280/730.2 |
| 6,478,329 | B1 * | 11/2002 | Yokoyama | B60R 21/23138 280/729 |
| 8,567,817 | B2 * | 10/2013 | Yamamoto | B60R 21/23138 280/729 |
| 8,616,579 | B2 * | 12/2013 | Suzuki | B60R 21/23138 280/729 |
| 8,684,408 | B2 * | 4/2014 | Thomas | B60R 21/231 280/730.2 |
| 8,955,875 | B2 * | 2/2015 | Maita | B60R 21/213 280/730.2 |
| 9,016,718 | B2 * | 4/2015 | Fukawatase | B60R 21/233 280/730.2 |
| 2003/0168836 | A1 * | 9/2003 | Sato | B60R 21/235 280/730.2 |
| 2005/0161927 | A1 * | 7/2005 | Yokoyama | B60R 21/23138 280/743.1 |
| 2006/0131847 | A1 * | 6/2006 | Sato | B60R 21/207 280/730.2 |
| 2007/0284859 | A1 * | 12/2007 | Kashiwagi | B60R 21/207 280/730.2 |
| 2008/0174093 | A1 * | 7/2008 | Inoue | B60R 21/207 280/730.2 |

* cited by examiner

*Primary Examiner* — Toan To
(74) *Attorney, Agent, or Firm* — BrooksGroup

(57) ABSTRACT

A number of variations may include a product comprising an airbag cushion constructed and arranged to provide an occupant with at least one of head, shoulder, or torso coverage, wherein the airbag cushion comprises an upper chamber and a lower chamber, and wherein the lower chamber is constructed and arranged to overlap at least a portion of a center console in a vehicle when the airbag cushion is in a deployed condition.

24 Claims, 6 Drawing Sheets

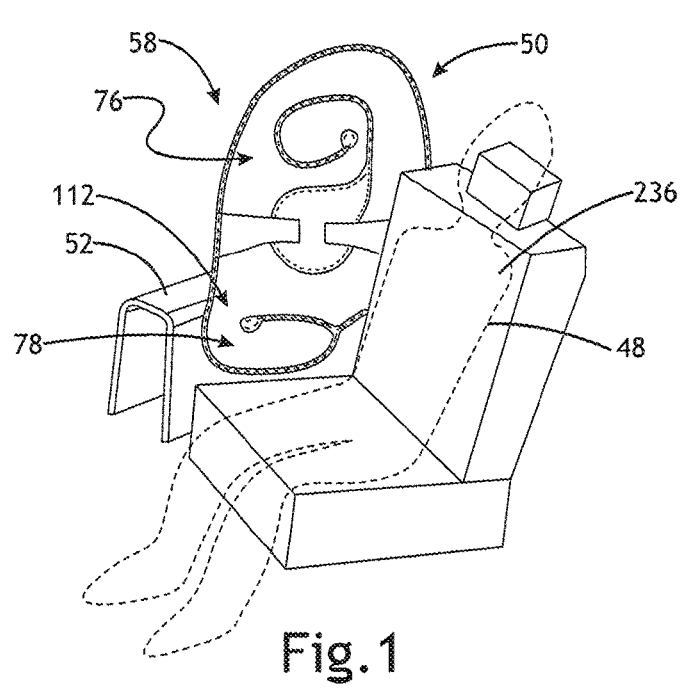
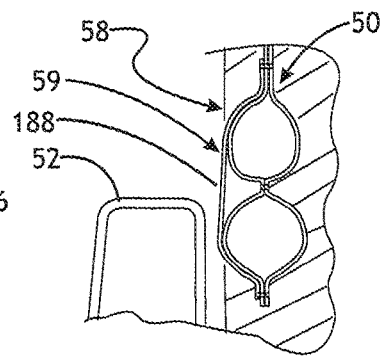
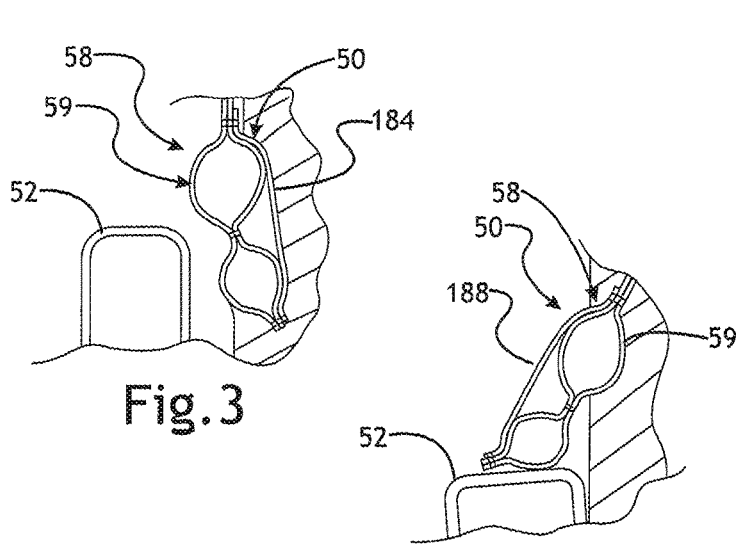
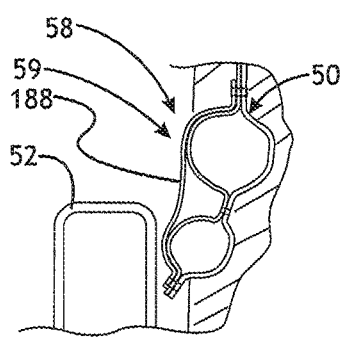

FRONT CENTER AIRBAG LOWER CHAMBER AND PANEL

TECHNICAL FIELD

The field to which the disclosure generally relates to includes safety restraints.

BACKGROUND

A vehicle may include one or more safety restraints.

SUMMARY OF ILLUSTRATIVE VARIATIONS

A number of variations may include a product comprising: an airbag cushion constructed and arranged so that in a deployed condition the airbag cushion provides an occupant with at least one of lateral head, shoulder, or torso coverage, wherein the airbag cushion comprises an upper chamber and a lower chamber, and wherein the lower chamber is constructed and arranged to overlap at least a portion of a center console in a vehicle when the airbag cushion is in the deployed condition.

A number of variations may include a front center airbag constructed and arranged so that in a deployed condition the front center airbag provides an occupant with at least one of head, shoulder, or torso coverage, and wherein the front center airbag comprises a cushion having an upper chamber and a lower chamber, and wherein the lower chamber inflates with a gas at a rate slower than the upper chamber during deployment.

A number of variations may include a product comprising: an airbag cushion constructed and arranged so that in a deployed condition the airbag cushion provides an occupant with at least one of lateral head, shoulder, or torso coverage, wherein the airbag cushion comprises at least one internal seam which is constructed and arranged to form a numeral six shape.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 illustrates a perspective view of an airbag in an inflated condition according to a number of variations.

FIG. 2 illustrates a front section view of an airbag in an inflated condition according to a number of variations.

FIG. 3 illustrates a front section view of an airbag in an inflated condition according to a number of variations.

FIG. 4 illustrates a front section view of an airbag in an inflated condition according to a number of variations.

FIG. 5 illustrates a front section view of an airbag in an inflated condition according to a number of variations.

DETAILED DESCRIPTION OF ILLUSTRATIVE VARIATIONS

Figure 6:
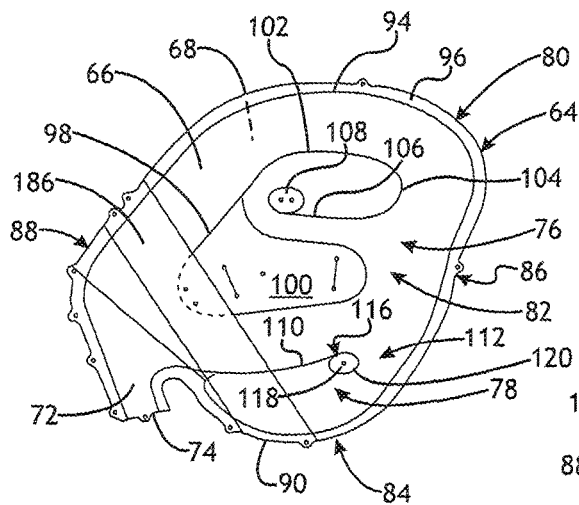
FIG. 6 illustrates a side view of an airbag cushion assembly according to a number of variations.

The following description of the variations is merely illustrative in nature and is in no way intended to limit the scope of the invention, its application, or uses.

FIGS. 1-27 illustrate a number of variations including a front center airbag 50. Referring to FIG. 1, in a number of variations, the front center airbag 50 may be constructed and arranged to provide an occupant 48 with head, shoulder, and/or torso coverage during an impact event by deploying adjacent to these body regions. The front center airbag 50 may be constructed and arranged to provide an overlap over a portion of a center console 52 which may be in a vehicle which may improve the restraint of the front center airbag 50 in a deployed condition 58 by using the center console 52 as a reaction surface for the front center airbag 50.

Referring to FIGS. 6-19, in a number of variations, the front center airbag 50 may include a cushion assembly 64 which may include an upper cushion chamber 76 and at least one lower cushion chamber 78. The cushion assembly 64 may be constructed and arranged so that as the front center airbag 50 deploys, inflation of the lower cushion chamber 78 with inflator gas may be delayed which may prevent or reduce the probability that the front center airbag 50 hangs up on the center console 52 during the deployment process as the front center airbag swings over the center console during the initial phase of deployment and then positions itself between the center console 52 and the adjacent occupant 48. The delayed inflation of the lower cushion chamber 78 may allow this portion of the cushion to pass across the center console 52 in a substantially uninflated state and thus achieve a fully deployed position adjacent the center console 52 after it has passed over the center console 52 and the lower cushion chamber has fully inflated. The lower cushion chamber 78 may be constructed and arranged so that interaction between the cushion assembly 64 and the center console 52 may occur at a location on the center console 52 which may be generally below or forward of an occupant 48 shoulder loading point on the cushion assembly 64.

In a number of variations, the cushion assembly 64 may include a first panel 66 that forms the inboard surface of the cushion assembly 64 and a second panel 68 that forms the outboard surface of the cushion assembly 64, variations of which are illustrated in FIGS. 6-10. The first panel 66 and second panel 68 may or may not be symmetrical and may be comprised of any number of constant radius or variable radius shapes including, but not limited to, a circle, an ellipse shape, an oval-like shape, or an egg-like shape. The first and second panels 66, 68 may each include a neck 72 which may extend downward from a rear end 70 of the panel 66, 68 which may be constructed and arranged to accommodate an inflator 218, as will be discussed hereafter. In one variation, the first and/or second panels 66, 68 may comprise a woven material. In a number of variations, the first panel 66 and/or the second panel 68 may also include a coating. Any number of coatings may be used including, but not limited to, a rubberized and/or silicone coating. In a number of variations one or more reinforcement panels, diffusers, and/or cushion attachments (not illustrated) may be attached to the first panel 66 and/or the second panel 68 which may increase the strength of the cushion assembly 64 and may protect the cushion assembly 64. In another variation, the first panel 66 and the second panel 68 may be woven as one piece.

In a number of variations, the first panel 66 and the second panel 68 may be attached together using at least one seam 94 which may extend at an offset around the perimeter of the first panel 66 and the second panel 68 to the end 74 of the necks 72 so that the end 74 of the necks 72 may remain open so that an inflator 218 may be positioned within this opening and fill the cushion assembly 64 with inflator gas upon deployment, as will be discussed hereafter. A cushion selvedge 96 may remain around the perimeter seam 94. In a number of variations, the perimeter seam 94 may comprise one or more rows of stitching and/or may be woven so that the cushion assembly 64 may be one piece. In a number of variations, at least a portion of the perimeter seam 94 may also include a sealant to retain gas in the airbag cushion assembly 64 at the perimeter seam 94. Any number of sealants may be used including, but not limited to, a rubberized material and/or silicone. In another variation, the perimeter seam 94 may not be sealed.

In a number of variations, the cushion assembly 64 may also include one or more seams 98, 102, 110, 126, 132, 142, 148, 154, 162, 172 which may be used to control the shape and inflated volume of the cushion assembly 64 in an inflated condition 58. The one or more seams 98, 102, 110, 126, 132, 142, 148, 154, 162, 172 may comprise one or more rows of stitching and/or may be woven into the cushion assembly 64. In a number of variations, when the front center airbag 50 may be deployed, the airbag cushion assembly 64 may fill within the perimeter seam 94 with a gas and around the seams 98, 102, 110, 126, 132, 142, 148, 154, 162, 172 and may inflate. In a number of variations, at least a portion of the seams 98, 102, 110, 126, 132, 142, 148, 154, 162, 172 may include a sealant to further retain gas in the airbag cushion assembly 64. Any number of sealants may be used including, but not limited to, a rubberized material and/or silicone. In another variation, the seams 98, 102, 110, 126, 132, 142, 148, 154, 162, 172 may not be sealed.

In a number of variations, the upper cushion chamber 76 may comprise a middle region 82 and an upper region 80 of the cushion assembly 64 and the lower cushion chamber 78 may comprise a lower region 84 of the cushion assembly 64. In one variation, the upper cushion chamber 76 may include a first internal seam 98 around a portion of the middle region 82 and may create a first inactive region 100. The first inactive region 100 may be any number of configurations including, but not limited to, circular, oval shaped, and/or tear drop shaped. In a number of variations, a second internal seam 102 may extend from the first internal seam 98. In one variation, the second internal seam 102 may curve or loop 104 outward toward the front end 86 of the cushion assembly 64 and then back toward the first inactive region 100 and the rear end 88 of the cushion assembly 64 so that the first internal seam 98 and the second internal seam 102 together form a general numeral six shape with the first inactive region 100 in the lower portion of the numeral six shape, variations of which are illustrated in FIGS. 6-10. The construction of the "six" shape may reduce internal stress of the cushion assembly 64 during deployment and may also enable the use of a thinner cushion material and a thinner sealant at the seams 98, 102. This may also reduce the package size of the front center airbag 50 and the cost of the front center airbag 50. The second internal seam 102 may also include a second end 106 which may include a second inactive region 108. The second inactive region 108 may be any number of shapes including, but not limited to, tear drop, oval, or circular, variations of which are also illustrated in FIGS. 6-10.

Figure 11:
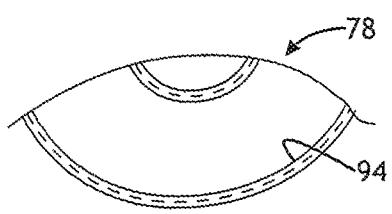
FIG. 11 illustrates a close-up view of a lower cushion chamber according to a number of variations.

In one variation, the cushion assembly 64 having a general numeral six shape may not include a separate lower cushion chamber, a variation of which is illustrated in FIG. 11.

In a number of variations, the lower cushion chamber 78 may be constructed and arranged so that during a deployment event, the lower cushion chamber 78 may inflate with a gas at a delayed rate when compared to the upper cushion chamber 76. In one variation, the lower cushion chamber 78 may be constructed and arranged so that in an inflated condition, the widest portion 92 of the lower cushion chamber 78 may be near the center of the lower cushion chamber 78. In another variation, the lower cushion chamber 78 may be constructed and arranged so that in an inflated condition, the widest inflated portion 92 of the lower cushion chamber 78 may be at the rearward end 91 of the lower cushion chamber 78, variations of which are illustrated in FIGS. 12 and 13.

The lower cushion chamber 78 may be formed with one or more internal seams 110, 126, 132, 142, 148, 154, 162, which may separate the lower cushion chamber 78 from the upper cushion chamber 76. In a number of variations, the one or more internal seams 110, 126, 132, 142, 148, 154, 162 and/or the perimeter seam 94 may form an orifice 112 between the upper cushion chamber 76 and the lower cushion chamber 78, variations of which are illustrated in FIGS. 6-10 and 12-19. The orifice 112 may be located at the front end 86 of the cushion assembly 64 so that gas may enter the lower cushion chamber 78 at a location further forward than the centroid or middle region 82 of the cushion assembly 64. The size and/or shape of the orifice 112 may assist in controlling the delay in inflation of the lower cushion chamber 78 with respect to the rest of the cushion. In a number of variations, the orifice 112 may neck or narrow into the lower cushion chamber 78 which may further delay inflation of gas into the lower cushion chamber 78. The orifice 112 may be narrowed using one or more internal seams 110, 126, 132, 142, 148, 154, 162, which may be any number of configurations including, but not limited to, rounded, tear drop, or a variable radius shape. The length of the narrowed or neck of the orifice 112 may be increased and/or the width may be decreased which may further delay the inflation time of the lower cushion chamber 78 by providing a more difficult entry path for the inflation gas to enter the lower cushion chamber 78.

Figure 7:
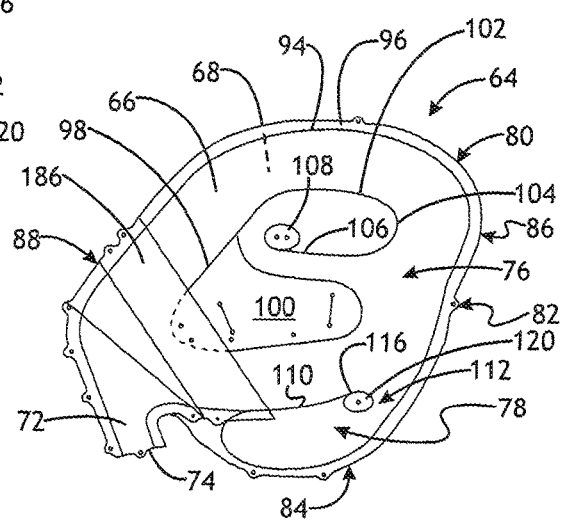
FIG. 7 illustrates a side view of an airbag cushion assembly according to a number of variations.
Figure 8:
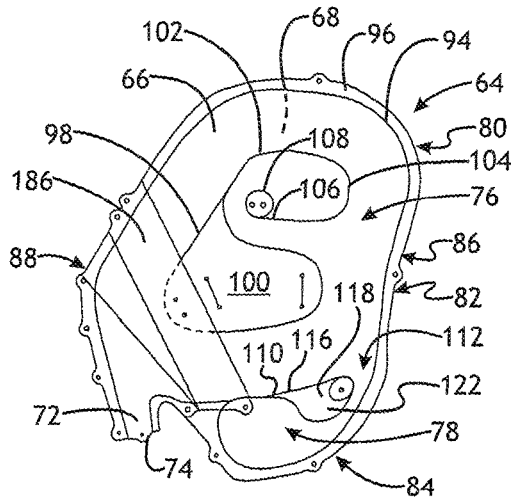
FIG. 8 illustrates a side view of an airbag cushion assembly according to a number of variations.
Figure 9:
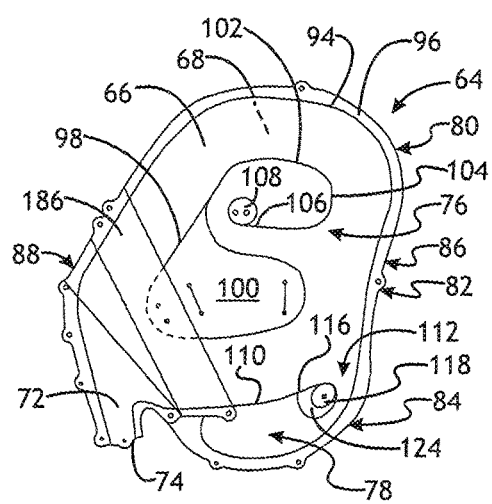
FIG. 9 illustrates a side view of an airbag cushion assembly according to a number of variations.
Figure 13:
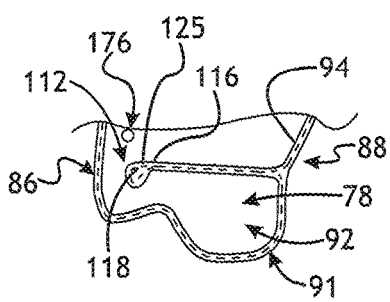
FIG. 13 illustrates a close-up view of a lower cushion chamber according to a number of variations.
Figure 12:
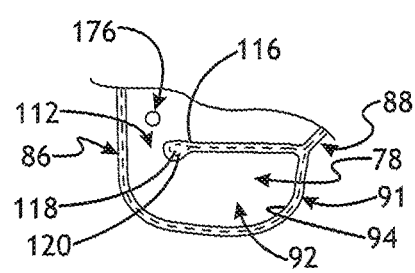
FIG. 12 illustrates a close-up view of a lower cushion chamber according to a number of variations.
Figure 14:
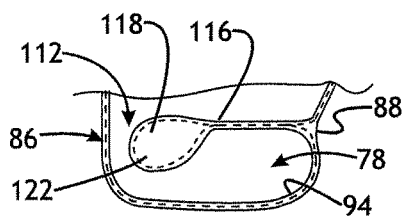
FIG. 14 illustrates a close-up view of a lower cushion chamber according to a number of variations.

In one variation, a first internal seam 110 may extend horizontally from the rear end 86 of the cushion assembly 64 from the perimeter seam 94, variations of which are illustrated in FIGS. 6-9 and 12-14. In one variation, the first internal seam 110 may extend across approximately more than half the length of the lower cushion chamber 78, variations of which are illustrated in FIGS. 6-9 and 12-14. A second end 116 of the first internal seam 110 may form a first inactive region 118 which may cause one or more portions of the lower cushion chamber 78 to neck down which may increase the fill time of the lower cushion chamber 78. The first inactive region 118 may be any number of configurations including, but not limited to, rounded 120, variations of which are illustrated in FIGS. 6, 7, and 12, a tear drop shape 122, variations of which are illustrated in FIGS. 8 and 14, an elongated circle or oval shape 124, a variation of which is illustrated in FIG. 9, or an elongated circle or oval which may bend downward 125, a variation of which is illustrated in FIG. 13.

Figure 15:
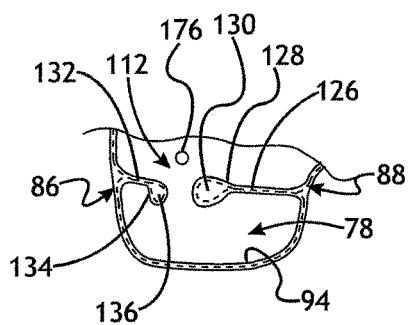
FIG. 15 illustrates a close-up view of a lower cushion chamber according to a number of variations.

In another variation, a first internal seam 126 may extend horizontally from the rear end 88 of the cushion assembly 64 from the perimeter seam 94, and a second internal seam 132 may extend horizontally from the front end 86 of the cushion assembly 64 from the perimeter seam 94 approximately opposite of the first internal seam 126, a variation of which is illustrated in FIG. 15. The first internal seam 126 may extend approximately more than half the length of the lower cushion chamber 78 while the second internal seam 132 may extend less than half the length of the lower cushion chamber 78. A second end 128 of the first internal seam 126 may include a first inactive region 130 and a second end 134 of the second internal seam 132 may include a second inactive region 136. The first and second inactive regions 130, 136 may be any number of configurations including, but not limited to, rounded, variable radius shaped, or a tear dropped shape. In one variation, the first and/or the second inactive region 130, 136 may bend downward.

Figure 16:
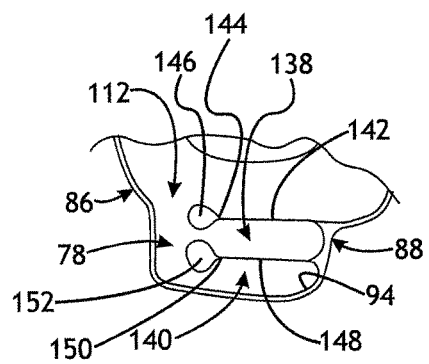
FIG. 16 illustrates a close-up view of a lower cushion chamber according to a number of variations.
Figure 17:
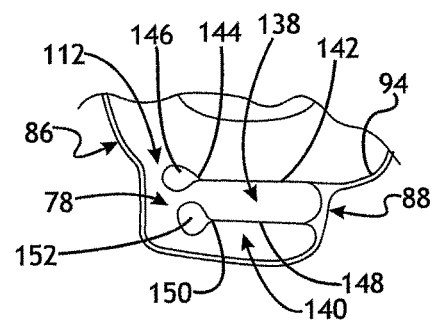
FIG. 17 illustrates a close-up view of a lower cushion chamber according to a number of variations.

In another variation, a first internal seam 142 and a second internal seam 148 may each extend horizontally from a rear end 88 of the perimeter seam 94, a variation of which is illustrated in FIGS. 16 and 17. The first internal seam 142 and the second internal seam 148 may extend a distance from the perimeter seam 94 of the cushion assembly 64. The first internal seam 142 and the second internal seam 148 may each extend more than halfway across the length of the lower cushion chamber 78. The first internal seam 142 and the second internal seam 148 may be approximately parallel to each other. The first and second internal seams 142, 148 may form a first tube portion 138 and a second tube portion 140 which may act as a first and second lower chamber. In one variation, the first internal seam 142 and the second internal seam 148 may extend the same distance, a variation of which is illustrated in FIG. 16. In another variation, the first internal seam 142 may extend further than the second internal seam 148, a variation of which is illustrated in FIG. 17. A second end 144 of the first internal seam 142 may include a first inactive region 146 and a second end 150 of the second internal seam 148 may include a second inactive region 152. The first and second inactive regions 146, 152 may be any number of configurations including, but not limited to, a variable radius shape or a rounded shape. The first and second inactive regions 146, 152 may be the same shape or may comprise different shapes. The position of the first and second inactive regions 146, 152 in the lower cushion chamber 78 may also be varied beyond the locations shown in FIGS. 16 and 17.

Figure 18:
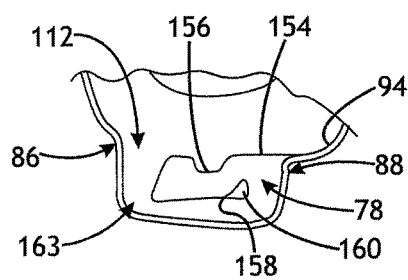
FIG. 18 illustrates a close-up view of a lower cushion chamber according to a number of variations.

In another variation, an internal seam 154 may extend horizontally from a rear portion 88 of the perimeter seam 94, may dip or curve 156 approximately central of the lower cushion chamber 78, may continue to extend a distance horizontally toward the front end 86 of the cushion assembly 64, may extend a distance at an angle downward toward the front end 86 of the cushion assembly 64, and may then extend horizontally toward the rear end 88 of the cushion assembly 64, a variation of which is illustrated in FIG. 18. This approach positions the smallest cross-section of the orifice 112 at the forward bottom region 163 of the lower cushion chamber 78. In a number of variations, the dip or curve 156 in the internal seam 154 may provide a wider and more rigid cushion cross-section above the lower cushion chamber 78 which may prevent or reduce bending of the cushion assembly 64 in the deployed condition. The internal seam 154 may extend a length more than half the length of the lower cushion chamber 78. A second end 58 of the internal seam 154 may include an inactive region 160. In one variation, the inactive region 160 may comprise an oblong tear drop shape.

Figure 19:
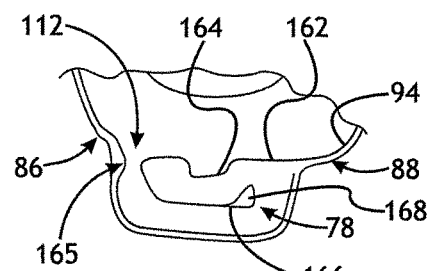
FIG. 19 illustrates a close-up view of a lower cushion chamber according to a number of variations.

In another variation, an internal seam 162 may extend horizontally from a rear end 88 of the perimeter seam 94, may dip or curve 164 approximately central of the lower cushion chamber 78, may continue to extend a distance horizontally toward the front end 86 of the cushion assembly 64, may extend a distance at an angle downward toward the rear end 88 of the cushion assembly 64, and may then extend horizontally toward the rear end 88 of the cushion assembly 64, a variation of which is illustrated in FIG. 19. This approach positions the smallest cross-section of the orifice 112 at the forward upward region 165 of the lower cushion chamber 78. In a number of variations, the dip or curve 164 in the internal seam 162 may provide a wider and more rigid cushion cross-section above the lower cushion chamber 78 which may prevent or reduce bending of the cushion assembly 64 in a deployed condition. The internal seam 162 may extend a length more than half the length of the lower cushion chamber 78. A second end 166 of the internal seam 162 may include an inactive region 168. The inactive region 168 may be any number of shapes including, but not limited to, an oblong tear drop shape.

Figure 10:
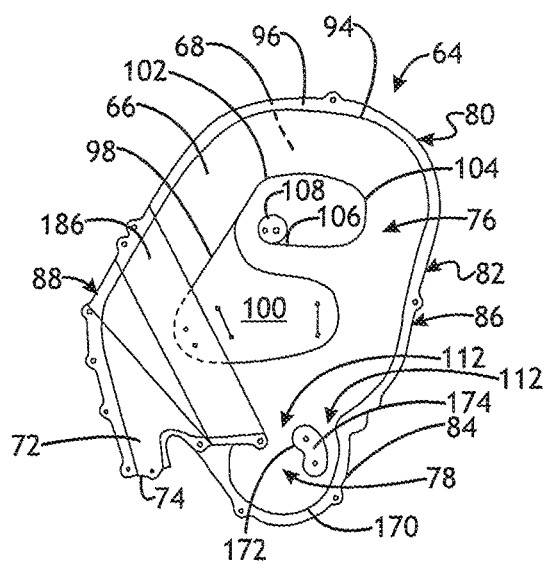
FIG. 10 illustrates a side view of an airbag cushion assembly according to a number of variations.

In another variation, the perimeter seam 94 of the lower cushion chamber 78 may be a partial circular-like shape 170 and may include an internal seam 172 which may surround a portion of the lower cushion chamber 78 and may form an inactive region 174. The inactive region 174 may be any number of shapes including, but not limited to, circular, oval shape, or kidney shaped, a variation of which is illustrated in FIG. 10. In yet another variation, a small orifice 112 may be located on either side of an inactive region 170, a variation of which is also illustrated in FIG. 10.

In a number of variations, a sacrificial material 176 may be located inside the lower cushion chamber 78, variations of which are illustrated in FIGS. 12, 13, and 15. The sacrificial material 176 temporarily attaches the first panel 66 and the second panel 68 together and may be adjacent the orifice 112. During a deployment condition 58, gas may enter the cushion assembly 64 and may cause the sacrificial material 176 to separate which takes some time to occur and which then may further increase the time required for the gas to reach the orifice 112 and inflate the lower cushion chamber 78. The sacrificial material 178 may comprise any number of materials including, but not limited to, one or more rubberized material and/or silicone dots.

Referring to FIGS. 2-5 and 20-25, in a number of variations, the cushion assembly 64 may include one or more external tethers 178, 184, 186, 188, 190, 196, 202, 208 which may assist in guiding the trajectory and kinematics of the front center airbag 50 as it deploys from a folded to an unfolded state 58. The one or more external tethers 178, 184, 186, 188, 190, 196, 202, 208 may be constructed and arranged to guide the lower cushion chamber's 78 trajectory over the center console 52 during a deployment condition 58 and may further position the lower cushion chamber 78 adjacent the center console 52 once the lower cushion chamber 78 passes over the top of the center console 52 and the lower cushion chamber 78 fills completely.

Figure 20:
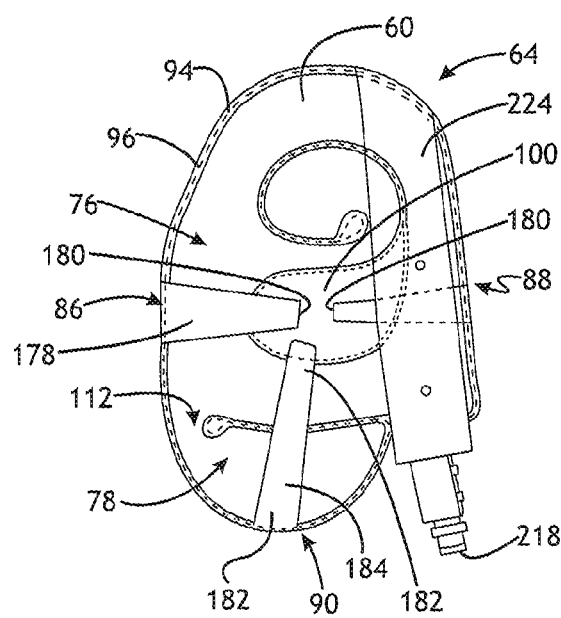
FIG. 20 illustrates a side view of a cushion assembly according to a number of variations.
Figure 21:
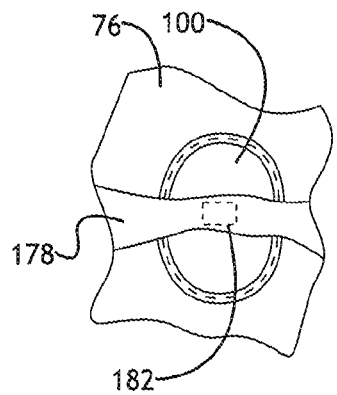
FIG. 21 illustrates a close-up view of a tether according to a number of variations.
Figure 22:
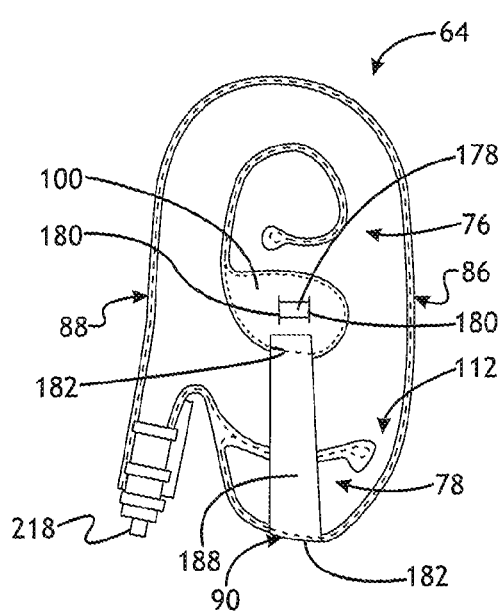
FIG. 22 illustrates a side view of a cushion assembly according to a number of variations.
Figure 26:
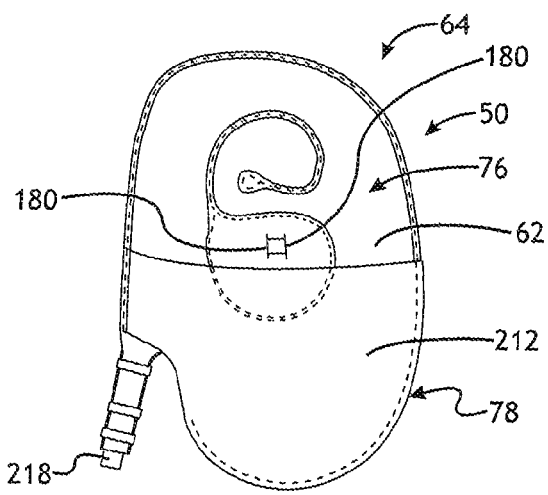
FIG. 26 illustrates a side view of a cushion assembly according to a number of variations.

In one variation, a first external tether 178 may be located on the outboard side 60 of the cushion assembly 64 and may extend from the cushion selvedge 96 or other attachment location on the rear end 88 of the cushion assembly 68 to a front end 86 of the cushion assembly 64. In one variation, the first external tether 178 may be attached to the front end 86 of the cushion assembly 64 and may extend approximately horizontal to the rear end 88 of the cushion assembly 64 and may be attached at or near the rear end 88 of the cushion assembly 64 or to a cushion sleeve 224, a variation of which is illustrated in FIG. 20. The first external tether 178 may comprise a length which may be shorter than the length of the cushion assembly 64 which may be underneath the first external tether 178 in an inflated condition so that the lower cushion chamber 78 may curve outboard toward the occupant 48 when inflated and the effective tether length may be shorter than the cushion length. The first external tether 178 may be attached to the cushion assembly 64 in any number of variations including, but not limited to, sewing the first external tether 178 to the cushion selvedge 96 using one or more sew lines or by having the tether 178 integrally woven into the cushion assembly 68. In a number of variations, the first external tether 178 may also be attached to an inactive region 100 in the upper cushion chamber 76. The first external tether 178 may be attached to the inactive region 100 in any number of variations including, but not limited to, routing the external tether 178 through one or more slots 180 which may be located in the inactive region 100, variations of which are illustrated in FIGS. 20, 22 and 26 and/or sewing 182 the first external tether 178 to the inactive region 100, a variation of which is illustrated in FIG. 21.

In a number of variations, a second external tether 184 may be attached to the outboard side 60 of the cushion assembly 64, a variation of which is illustrated in FIG. 20. In one variation, the second external tether 184 may extend approximately vertically upward from the cushion selvedge 96 on the bottom end 90 of the cushion assembly 64 to the inactive region 100 in the upper cushion chamber 76, a variation of which is also illustrated in FIG. 20. The second external tether 184 may comprise a length which may be less than the cushion assembly 64 which may be underneath the second external tether 184 when the cushion assembly 64 may be in an inflated condition 59 which may cause the lower cushion chamber 78 to rotate outboard 60 toward the occupant 48, a variation of which is illustrated in FIG. 3.

In one variation, the second external tether 184 may be constructed and arranged so that the lower cushion chamber 78 angles significantly toward the occupant 48 and extends in an approximately horizontal direction which may create a standoff from any number of interior vehicle trim components including, but not limited to, a center console 52.

In another variation, the second external tether 184 may be a length which may be the same length of the cushion assembly 64 in an inflated condition 59 which may provide a tension load path which may prevent or reduce bending of the lower cushion chamber 78 when the cushion assembly 64 may be pushed toward the center console 52 by an occupant 48. The second external tether 184 may be attached to the cushion selvedge 96 and the first inactive region 100 in the upper cushion chamber 76 in any number of variations including, but not limited to, one or more sew lines 182 or being integrally woven.

In another variation, the second external tether 186 may extend upward at an angle toward the rear end 88 of the cushion assembly 64, variations of which are illustrated in FIGS. 6-10. In one variation, the second external tether 186 may extend from the cushion selvedge 96 on the bottom end 90 of the cushion assembly 64 to the cushion selvedge 96 on the rear end 88 of the cushion assembly 64, a variation of which is illustrated in FIG. 6. In another variation, the second external tether 186 may extend from a first internal seam 110 in the lower cushion chamber 78 to the cushion selvedge 96 on the rear end 88 of the cushion assembly 64, variations of which are illustrated in FIGS. 7-10. The second external tether 186 may be attached to the cushion assembly 64 in any number of variations including, but not limited to, one or more sew lines 182 or being integrally woven.

In another variation, a third external tether 188 may be attached to the inboard side 62 of the cushion assembly 64, a variation of which is illustrated in FIG. 22. The third external tether 188 may extend approximately vertically upward from the cushion selvedge 96 on the bottom end 90 of the cushion assembly 64 to the inactive region 100 in the upper cushion chamber 76. The third external tether 188 may comprise a length which may be less than the cushion assembly 64 which may be adjacent to the third external tether 188 when the cushion assembly 64 is in an inflated condition 59 which may cause the lower cushion chamber 78 to rotate inboard toward the center console 52, a variation of which is illustrated in FIG. 5. In another variation, the third external tether 188 may comprise a length which may be less than the cushion assembly 64 which may be adjacent to the third external tether 188 when the cushion assembly 64 is in an inflated condition 59 which may cause the lower cushion chamber 78 to rotate on top of the center console 52, a variation of which is illustrated in FIG. 4. The third external tether 188 may be constructed and arranged so that the cushion assembly 64 may comprise a higher loft or thickness in the lower cushion chamber 78 which may reduce occupant 48 loading into any number of vehicle interior trim components including, but not limited to, a center console 52. The third external tether 188 may also prevent or reduce lateral travel of an occupant 48 in an impact event. In another variation, the third external tether 188 may be a length which may be the same length of the cushion assembly 64 in an inflated condition which may resist bending of the lower cushion chamber 78 when the cushion assembly 64 may be pushed toward the center console 52 by an occupant 48, a variation of which is illustrated in FIG. 2. The third external tether 188 may be attached to the cushion selvedge 96 and the inactive region 100 in any number of variations including, but not limited to, one or more sew lines 182 and being integrally woven.

Figure 23:
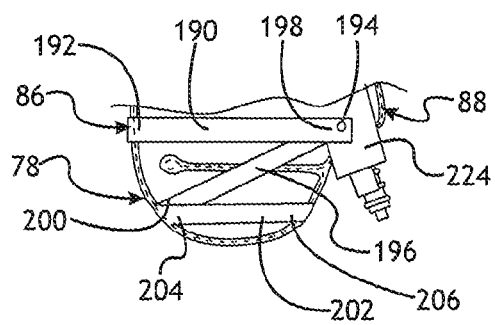
FIG. 23 illustrates a close-up view of a tether according to a number of variations.

In another variation, a series of external tethers 190, 196, 202 may be located on the outboard side 60 of the cushion assembly 64 and may form a zig zag pattern or a "Z" shape, a variation of which is illustrated in FIG. 23. A first end 192 of a fourth external tether 190 may be attached to the selvedge 96 on a front end 86 of the cushion assembly 64 and may extend approximately horizontal toward the rear end 88 of the cushion assembly 64 and the second end 194 may be attached to cushion selvedge 96 and/or a cushion sleeve 224 on the rear end 88 of the cushion assembly 64. A first end 198 of a fifth external tether 196 may be attached at or near to the second end 194 of the fourth external tether 190 and may extend downward at an angle to the front end 86 of the cushion assembly 64 and the second end 200 may be attached to the cushion selvedge 96 on the front end 96 of the cushion assembly 64. A first end 204 of a sixth external tether 202 may be attached at or near to the second end 200 of the fifth external tether 196 and may extend approximately horizontal toward the rear end 88 of the cushion assembly 64 and a second end 206 may be attached at or near to the cushion selvedge 96 on the rear end 88 of the cushion assembly 64. In one variation, the fourth, fifth, and sixth tethers 190, 196, 202 may be separate components. In other variations, the fourth, fifth, and/or sixth tethers 190, 196, 202 may comprise a single tether or two tethers. The tethers 190, 196, 202 may be attached to the cushion assembly 64 in any number of variations including, but not limited to, one or more sew lines 182 and being integrally woven.

Figure 24:
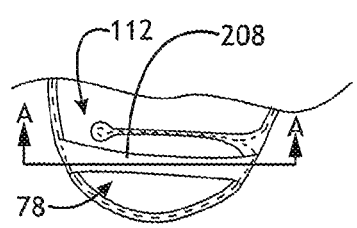
FIG. 24 illustrates a close-up view of a tether according to a number of variations.
Figure 25:
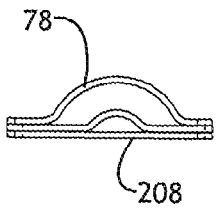
FIG. 25 illustrates a cross-section view along A-A of FIG. 24.

In another variation, a seventh external tether 208 may extend from the front end 86 of the cushion assembly 64 to the rear end 88 of the cushion assembly 64 on the outboard side 60 of the cushion assembly 64 adjacent the lower cushion chamber 78, a variation of which is illustrated in FIGS. 24-25. In a number of variations, the seventh external tether 208 may comprise a length so that it may be shorter in length than the lower chamber 78, a variation of which is illustrated in FIG. 25.

It is noted that the external tether configurations illustrated above may be used exclusively or combined in any number of variations. In a number of variations, the external tether configurations may control the position of the lower cushion chamber 78 so that the lower cushion chamber 78 may be parallel with the center console 52, a variation of which is illustrated in FIG. 2, skewed outboard toward the occupant 48, a variation of which is illustrated in FIG. 3, or skewed inboard toward the center console 52, a variation of which is illustrated in FIG. 5, on top of the center console 52, a variation of which is illustrated in FIG. 4, or partially on top of the center console 52 with or without a level of skewing (not illustrated).

It is noted that in a number of variations, the seats may move upward and downward and the center console 52 may be designed to be vertically stationary, therefore, different vertical and lateral relationships between the airbag cushion (mounted to the seat) and the center console 52 may be possible depending on the seat's vertical position and the cushion shape.

Referring to FIG. 26, in a number of variations, a protective layer 212 may be attached to the cushion assembly 64. The protective layer 212 may cover a portion of the inboard side 62 of the cushion assembly 64. In one variation, the protective layer 212 may cover approximately the lower quarter to half of the inboard side 62 of the cushion assembly 64. The protective layer 212 may comprise any number of materials including, but not limited to, a woven fabric. The protective layer 212 may include a coating on its outboard side. Any number of coatings may be used including, but not limited to, silicon and/or silicone. The protective layer 212 may be attached to the cushion assembly 64 in any number of variations including, but not limited to, one or more sew lines 182 which may extend around a portion of the protective layer 212, the cushion selvedge 96, and the first inactive region 100. The protective layer 212 may protect the front center airbag 50 from objects which may be adjacent the front center airbag 50 in a deployment condition 58 including, but not limited to, a seat, a center console 52, a gear shifter, a park brake, and/or other airbag components. The protective layer 212 may also act as a stiffening member for the cushion assembly 64 in a deployment condition 58 when an occupant 48 may load the cushion assembly 64 as the occupant 48 may move toward and/or over the center console 52.

Figure 27:
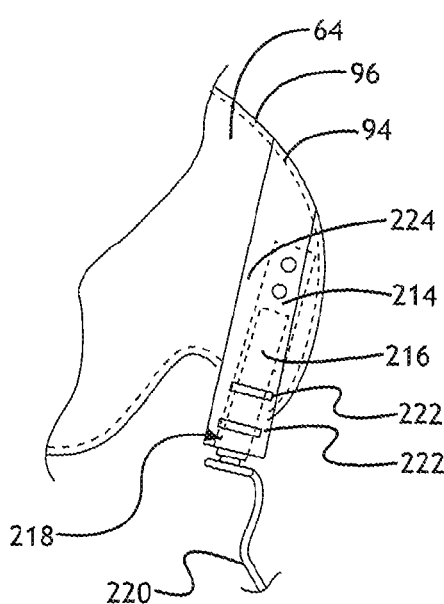
FIG. 27 illustrates a close-up view of an inflator assembly and mounting bracket attached to a cushion assembly according to a number of variations.

In a number of variations, the cushion assembly 64 may be attached to a mounting bracket 214 and an inflator assembly 216 via one or more clamps 222, a variation of which is illustrated in FIG. 27. The inflator assembly 216 may include an inflator 218 and a wire harness 220, a variation of which is also illustrated in FIG. 27. The wire harness 220 may be operatively connected to an airbag sensor (not illustrated) which may send a signal to the inflator 218 to deploy if any number of vehicle conditions occur including, but not limited to, an impact event. The airbag inflator 218 may be operatively connected to an electronic control unit (ECU) (not illustrated) which may include a sensing logic system which may be used to determine whether one or more impact events occur. If an impact event is detected which occurs above a predetermined deployment threshold in a particular direction, the ECU may then send a signal to the inflator 218 to deploy the front center airbag 50.

In a number of variations, the cushion assembly 64 may also include a sleeve 224 which may be constructed and arranged to accommodate the mounting bracket 214, the one or more clamps 222, the seat mounting mechanical fasteners 234, and/or a portion of the inflator assembly 216, variations of which are illustrated in FIGS. 20 and 27. The inflator assembly 216 may be attached to the cushion assembly 64 so that the inflator 218 may be in a position to fill the cushion assembly 64 with gas to inflate the cushion assembly 64.

Figure 28:
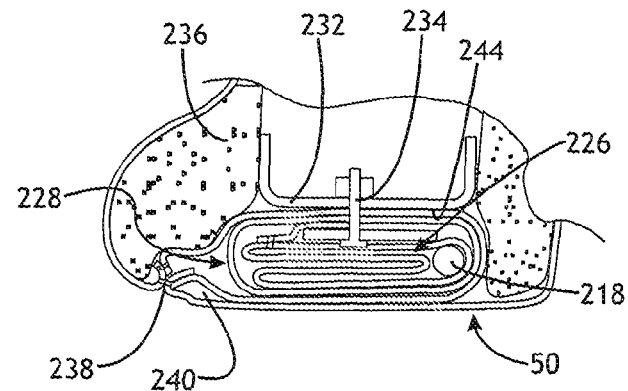
FIG. 28 illustrates a top section view of an airbag in a seat according to a number of variations.
Figure 29:
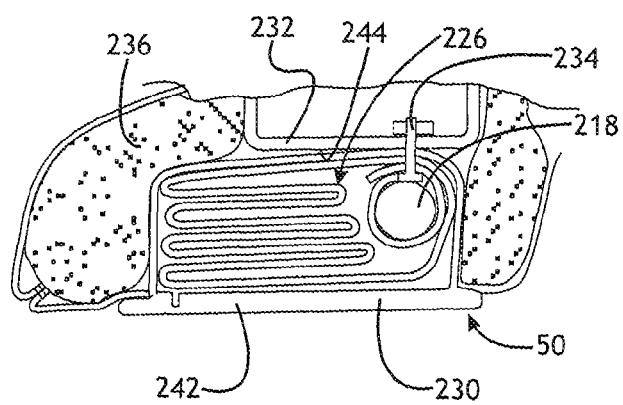
FIG. 29 illustrates a top section view of an airbag in a seat according to a number of variations.

In a number of variations, the cushion assembly 64 may be folded 226 to a compact size, variations of which are illustrated in FIGS. 28-29. The fold 226 of the cushion assembly 64 may also assist in the trajectory of the front center airbag 50 in a deployment condition 58. Any number of folds 226 may be used including, but not limited to, a roll fold, an accordion fold, or a combination of a roll fold and an accordion fold.

In a number of variations, a cover 228, 230 may surround at least a portion of the folded front center airbag 50. The cover 228, 230 may be any number of types and configurations including, but not limited to, a flexible wrap 228, a variation of which is illustrated in FIG. 28 or a more rigid shell 230, a variation of which is illustrated in FIG. 29. In one variation, the shell 230 may comprise a portion of a discrete deployment door 242 as will be discussed hereafter. The cover 228, 230 may comprise one single continuous component or may include several components.

In a number of variations, the front center airbag 50 may be mounted onto the inboard side 244 of the driver side or passenger side seat frame 232, variations of which are illustrated in FIGS. 28-29. The front center airbag 50 may be attached to the seat frame 232 in any number of variations including, but not limited to, one or more mechanical fasteners 234.

In a number of variations, the front center airbag 50 may be concealed within the seat 236. During deployment, the front center airbag 50 may deploy through a tear seam 238 on the seat 236, and/or may deploy through a deployment chute 240 inside of the seat 236, variations of which are illustrated in FIG. 28. In another variation, the front center airbag 50 may deploy through a discrete deployment door 242, a variation of which is illustrated in FIG. 29. The discrete deployment door 242 may be integrated into the seat 236 or may be part of the front center airbag 50.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: an airbag cushion constructed and arranged so that in a deployed condition the airbag cushion provides an occupant with at least one of lateral head, shoulder, or torso coverage, wherein the airbag cushion comprises an upper chamber and a lower chamber, and wherein the lower chamber is constructed and arranged to overlap at least a portion of a center console in a vehicle when the airbag cushion is in the deployed condition.

Variation 2 may include a product as set forth in Variation 1 wherein the airbag cushion comprises at least one first seam which extends around a portion of the perimeter of the airbag cushion and at least one second seam which creates an orifice between the upper chamber and the lower chamber in the cushion assembly so that during deployment, an inflator gas inflates the lower chamber at a slower rate than the upper portion.

Variation 3 may include a product as set forth in Variation 2 wherein the orifice at least one of necks down to further delay the entry of the gas into the lower chamber or is located forward on the cushion away from the inflator location.

Variation 4 may include a product as set forth in any of Variations 2-3 wherein the at least one second seam includes an inactive region to reduce stress at the orifice.

Variation 5 may include a product as set forth in any of Variations 2-4 further comprising a first cushion panel, a second cushion panel, and a sacrificial material, wherein the sacrificial material is attached to at least one of the first cushion panel or the second cushion panel, and wherein the sacrificial material is constructed and arranged so that, during deployment, the sacrificial material breaks apart as the cushion assembly inflates to delay the flow of the gas through the orifice.

Variation 6 may include a product as set forth in any of Variations 1-5 wherein the lower chamber is constructed and arranged so that in an inflated condition, the widest portion of the lower chamber is at least one of near a center of the lower chamber or near a rear of the lower chamber.

Variation 7 may include a product as set forth in any of Variations 1-6 wherein the airbag cushion further comprises at least one tether constructed and arranged to control the trajectory of the lower chamber during deployment.

Variation 8 may include a product as set forth in Variation 7 wherein a length of the at least one tether is less than a length of the cushion assembly in an inflated condition underneath the at least one tether so that in the inflated condition, the at least one tether causes the lower cushion chamber to rotate toward the direction of the at least one tether.

Variation 9 may include a product as set forth in Variation 7 wherein a length of the at least one tether is approximately the same length of the cushion assembly in an inflated condition underneath the at least one tether so that the cushion assembly resists bending of the lower chamber in the deployed condition.

Variation 10 may include a product as set forth in any of Variations 7-9 wherein the at least one tether is attached to at least one of an inboard side or an outboard side of the cushion assembly and extends approximately horizontally from a front end of the cushion assembly to a rear end of the cushion assembly.

Variation 11 may include a product as set forth in any of Variations 7-9 wherein the at least one tether is attached to at least one of an inboard side or an outboard side of the cushion assembly and extends approximately vertically upward from a bottom end of the cushion assembly.

Variation 12 may include a product as set forth in any of Variations 7-9 wherein the at least one tether is attached to at least one of an inboard side or an outboard side of the cushion assembly and extends from a portion of the lower chamber to a rear end of the cushion assembly.

Variation 13 may include a product as set forth in any of Variations 7-9 wherein the at least one tether comprises a first tether element extending approximately horizontally across an upper portion of the lower chamber, a second tether element extending approximately horizontally across a lower portion of the lower chamber, and a third tether element attached diagonally between the first tether and the second tether.

Variation 14 may include a product as set forth in any of Variations 1-13 wherein the cushion assembly further comprises a protective layer on an inboard side of the cushion assembly which covers at least a portion of the lower chamber to protect the cushion assembly from at least one of the center console, a seat, a gear shifter, a park brake, or a vehicle trim.

Variation 15 may include a front center airbag constructed and arranged so that in a deployed condition the front center airbag provides an occupant with at least one of head, shoulder, or torso coverage, and wherein the front center airbag comprises a cushion having an upper chamber and a lower chamber, and wherein the lower chamber inflates with a gas at a rate slower than the upper chamber during deployment.

Variation 16 may include a front center airbag as set forth in Variation 15 further comprising a tether, and wherein the tether is constructed and arranged to at least one of guide the lower chamber over a center console, guide the lower chamber to a position on top of the center console, or guide the lower chamber to a position adjacent the center console during deployment.

Variation 17 may include a front center airbag as set forth in any of Variations 15-16 further comprising a tether, wherein the tether is constructed and arranged to couple the upper chamber and the lower chamber together to provide a more rigid cushion cross-section above the lower cushion chamber to prevent or reduce bending of the front center airbag in the deployed condition.

Variation 18 may include a front center airbag as set forth in any of Variations 15-17 wherein the center console acts as a reaction surface for the front center airbag in the deployed condition.

Variation 19 may include a front center airbag as set forth in any of Variations 15-18 wherein the front center airbag is attached to a seat and passes through at least one of a tear seam in a seat, a deployment chute, or a discrete deployment door during deployment.

Variation 20 may include a product comprising: an airbag cushion constructed and arranged so that in a deployed condition the airbag cushion provides an occupant with at least one of lateral head, shoulder, or torso coverage, and wherein the airbag cushion comprises at least one internal seam which is constructed and arranged to form a numeral six shape.

The above description of select variations within the scope of the invention is merely illustrative in nature and, thus, variations or variants thereof are not to be regarded as a departure from the spirit and scope of the invention.

What is claimed is:

1. A product comprising:
an airbag cushion constructed and arranged so that in a deployed condition the airbag cushion provides an occupant with at least one of lateral head, shoulder, or torso coverage, wherein the airbag cushion comprises an upper chamber and a lower chamber, and a first cushion panel, a second cushion panel, and a sacrificial material, wherein the sacrificial material is attached to at least one of the first cushion panel or the second cushion panel, and wherein the sacrificial material is constructed and arranged so that, during deployment, the sacrificial material breaks apart as the cushion assembly inflates to delay the flow of the gas through the orifice.

2. The product of claim 1 wherein the airbag cushion comprises at least one first seam which extends around a portion of the perimeter of the airbag cushion and at least one second seam which creates an orifice between the upper chamber and the lower chamber in the cushion assembly so that during deployment, an inflator gas inflates the lower chamber at a slower rate than the upper portion.

3. The product of claim 2 wherein the orifice is constructed to provide either both or one of: a necked down section; or an orifice location forward on the cushion away from the inflator location.

4. The product of claim 2 wherein the at least one second seam includes an inactive region to reduce stress at the orifice.

5. The product of claim 1 wherein the lower chamber is constructed and arranged to overlap at least a portion of a center console in a vehicle when the airbag cushion is in the deployed condition.

6. The product of claim 1 wherein the lower chamber is constructed and arranged so that in an inflated condition, the widest portion of the lower chamber is at least one of near a center of the lower chamber or near a rear of the lower chamber.

7. The product of claim 1 wherein the airbag cushion further comprises at least one tether constructed and arranged to control the trajectory of the lower chamber during deployment, wherein the at least one tether is attached to at least one of an inboard side or an outboard side of the cushion assembly and extends approximately horizontally from a front end of the cushion assembly to a rear end of the cushion assembly.

8. The product of claim 7 wherein a length of the at least one tether is less than a length of the cushion assembly in an inflated condition underneath the at least one tether so that in the inflated condition, the at least one tether causes the lower cushion chamber to rotate toward the direction of the at least one tether.

9. The product of claim 7 wherein a length of the at least one tether is approximately the same length of the cushion assembly in an inflated condition underneath the at least one tether so that the cushion assembly resists bending of the lower chamber in the deployed condition.

10. The product of claim 7 wherein the at least one tether is attached to at least one of an inboard side or an outboard side of the cushion assembly and extends approximately vertically upward from a bottom end of the cushion assembly.

11. The product of claim 7 wherein the at least one tether is attached to at least one of an inboard side or an outboard side of the cushion assembly and extends from a portion of the lower chamber to a rear end of the cushion assembly.

12. A product comprising: an airbag cushion constructed and arranged so that in a deployed condition the airbag cushion provides an occupant with at least one of lateral head, shoulder, or torso coverage, wherein the airbag cushion comprises an upper chamber and a lower chamber, wherein the airbag cushion further comprises at least one tether constructed and arranged to control the trajectory of the lower chamber during deployment, wherein the at least one tether comprises a first tether element extending approximately horizontally across an upper portion of the lower chamber, a second tether element extending approximately horizontally across a lower portion of the lower chamber, and a third tether element attached diagonally between the first tether and the second tether.

13. A product comprising: an airbag cushion constructed and arranged so that in a deployed condition the airbag cushion provides an occupant with at least one of lateral head, shoulder, or torso coverage, wherein the airbag cushion comprises an upper chamber and a lower chamber, wherein the lower chamber is constructed and arranged to overlap at least a portion of a center console in a vehicle when the airbag cushion is in the deployed condition, wherein the airbag cushion further comprises at least one tether constructed and arranged to control the trajectory of the lower chamber during deployment, and wherein the at least one tether is attached to at least one of an inboard side or an outboard side of the cushion assembly and extends approximately horizontally from a front end of the cushion assembly to a rear end of the cushion assembly.

14. The product of claim 1 wherein the lower chamber is constructed and arranged to overlap at least a portion of a center console in a vehicle when the airbag cushion is in the deployed condition, wherein the cushion assembly further comprises a protective layer on an inboard side of the cushion assembly which covers at least a portion of the lower chamber to protect the cushion assembly from at least one of the center console, a seat, a gear shifter, a park brake, or a vehicle trim.

15. A front center airbag constructed and arranged so that in a deployed condition the front center airbag provides an occupant with at least one of head, shoulder, or torso coverage, and wherein the front center airbag comprises a cushion having an upper chamber and a lower chamber, wherein the lower chamber inflates with a gas at a rate slower than the upper chamber during deployment, and an inflator with a discharge in the upper chamber and not directly in the lower chamber so that gas must flow through the upper chamber to reach the lower chamber.

16. The front center airbag of claim 15 further comprising a tether, and wherein the tether is constructed and arranged to at least one of guide the lower chamber over a center console, guide the lower chamber to a position on top of the center console, or guide the lower chamber to a position adjacent the center console during deployment.

17. The front center airbag of claim 15 further comprising a tether, wherein the tether is constructed and arranged to couple the upper chamber and the lower chamber together to provide a more rigid cushion cross-section above the lower cushion chamber to prevent or reduce bending of front center airbag in the deployed condition.

18. The front center airbag of claim 15 wherein the center console acts as a reaction surface for the front center airbag in the deployed condition, and wherein the lower chamber has a front end at a forward-most side of the airbag cushion relative to the occupant, wherein an outside wall of the airbag cushion is located at the front end and wherein the orifice is located along the outside wall.

19. The front center airbag of claim 15 wherein the front center airbag is attached to a seat and passes through at least one of a tear seam in a seat, a deployment chute, or a discrete deployment door during deployment.

20. A product comprising:
an airbag cushion constructed and arranged so that in a deployed condition the airbag cushion provides an occupant with at least one of lateral head, shoulder, or torso coverage, the airbag cushion having an upper chamber and a lower chamber, an inflator that has a discharge in the upper chamber, an orifice restricting inflation gas from entering the lower chamber from the upper chamber so that the inflator inflates the upper chamber before the lower chamber, wherein the lower chamber is constructed and arranged to overlap at least a portion of a center console in a vehicle when the airbag cushion is in the deployed condition.

21. The product of claim 20 wherein the airbag cushion comprises at least one internal seam which is constructed and arranged to form a numeral six shape.

22. The product of claim 20 wherein the lower chamber has a front end at a forward-most side of the airbag cushion relative to the occupant, wherein an outside wall of the airbag cushion is located at the front end and wherein the orifice is located along the outside wall.

23. The product of claim 22 wherein the orifice is formed by an internal seam inside the airbag cushion and separating the upper chamber from the lower chamber except at the orifice.

24. The product of claim 23 wherein the internal seam includes an inactive region where the airbag cushion forms a closed space separated from the upper and lower chambers, wherein the inactive region is located at the orifice and the orifice is defined between the inactive region and the outside wall at the front end.

* * * * *